US011064561B2

United States Patent
Arngren et al.

(10) Patent No.: US 11,064,561 B2
(45) Date of Patent: Jul. 13, 2021

(54) METHOD AND ARRANGEMENT FOR PROVIDING AUTONOMOUS EMERGENCY ASSISTANCE

(71) Applicant: Telefonaktiebolaget LM Ericsson (publ), Stockholm (SE)

(72) Inventors: Tommy Arngren, Södra Sunderby (SE); Jonas Pettersson, Luleå (SE); Ylva Timner, Luleå (SE); Min Wang, Luleå (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/648,328

(22) PCT Filed: Dec. 22, 2017

(86) PCT No.: PCT/EP2017/084475
§ 371 (c)(1),
(2) Date: Mar. 18, 2020

(87) PCT Pub. No.: WO2019/120573
PCT Pub. Date: Jun. 27, 2019

(65) Prior Publication Data
US 2020/0229267 A1 Jul. 16, 2020

(51) Int. Cl.
*H04M 11/04* (2006.01)
*H04W 76/50* (2018.01)
(Continued)

(52) U.S. Cl.
CPC ........... *H04W 76/50* (2018.02); *B64C 39/024* (2013.01); *H04B 7/18506* (2013.01);
(Continued)

(58) Field of Classification Search
CPC ....... H04W 76/50; H04W 76/28; H04W 4/90; H04W 4/021; H04W 8/005; H04W 48/10; B64C 39/024; B64C 2201/122
(Continued)

(56) References Cited

U.S. PATENT DOCUMENTS 9,198,162 B2 * 11/2015 Van Phan ............. H04W 72/12
2016/0028471 A1 * 1/2016 Boss ..................... H04B 7/2606
455/406
(Continued)

FOREIGN PATENT DOCUMENTS

EP    3101873 A1    12/2016
WO   2015021159 A1   2/2015

OTHER PUBLICATIONS

International Search Report and Written Opinion of the International Searching Authority for PCT International Application No. PCT/EP2017/084475 dated Sep. 3, 2018, 10 pages.

*Primary Examiner* — Danh C Le
(74) *Attorney, Agent, or Firm* — Sage Patent Group

(57) ABSTRACT

A method for enabling autonomous emergency assistance for a communication device, CD, registered in a regular cellular network is presented. The method is performed in an autonomous unmanned aerial vehicle, UAV, and comprises directing the UAV to a geographical region connected to a preregistered position of the CD, emulating a cellular network in the geographical region, wherein the UAV and the CD are without connectivity with the regular cellular network, and providing autonomous emergency assistance for the CD in the geographical region. A CD, a UAV, a computer program and a computer program product are also presented.

11 Claims, 7 Drawing Sheets

(51) Int. Cl.
*H04W 76/28* (2018.01)
*H04W 4/90* (2018.01)
*B64C 39/02* (2006.01)
*H04B 7/185* (2006.01)
*H04W 4/021* (2018.01)
*H04W 8/00* (2009.01)
*H04W 48/10* (2009.01)

(52) U.S. Cl.
CPC .............. *H04W 4/021* (2013.01); *H04W 4/90* (2018.02); *H04W 8/005* (2013.01); *H04W 48/10* (2013.01); *H04W 76/28* (2018.02); *B64C 2201/122* (2013.01)

(58) Field of Classification Search
USPC .................................. 455/404.1, 422.1, 12.1
See application file for complete search history.

(56) References Cited

U.S. PATENT DOCUMENTS

| | | | |
|---|---|---|---|
| 2016/0117933 A1* | 4/2016 | Chan ................... | G08G 5/0086 |
| | | | 705/317 |
| 2017/0256717 A1 | 9/2017 | Thomas | |
| 2017/0264833 A1* | 9/2017 | Barnes .................. | G03B 15/05 |
| 2018/0038695 A1* | 2/2018 | Bitra .................... | G08G 5/0069 |
| 2018/0039262 A1* | 2/2018 | Fox ..................... | H04B 7/18506 |
| 2018/0247544 A1* | 8/2018 | Mustafic .............. | G08G 5/0039 |
| 2018/0375568 A1* | 12/2018 | De Rosa .............. | H04W 72/04 |
| 2019/0053192 A1* | 2/2019 | Rune ................... | H04W 68/02 |
| 2019/0316910 A1* | 10/2019 | Floury ............... | H04B 7/18504 |

\* cited by examiner

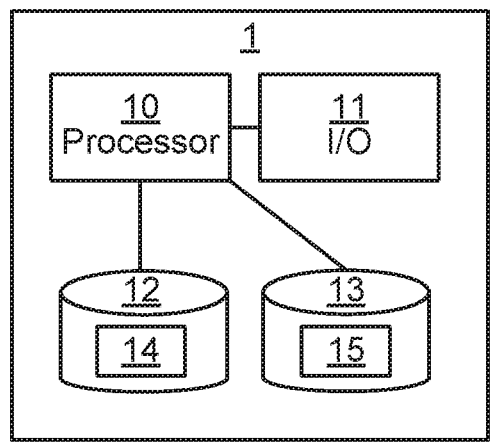
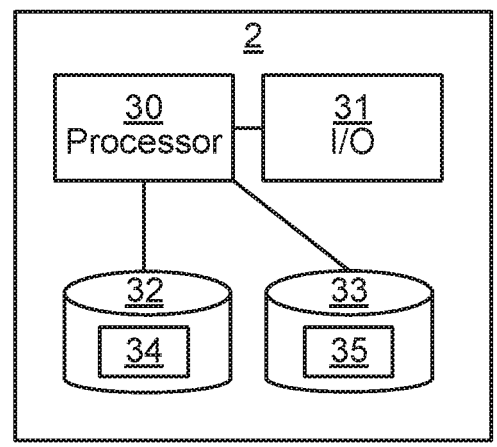
Fig. 8    Fig. 9
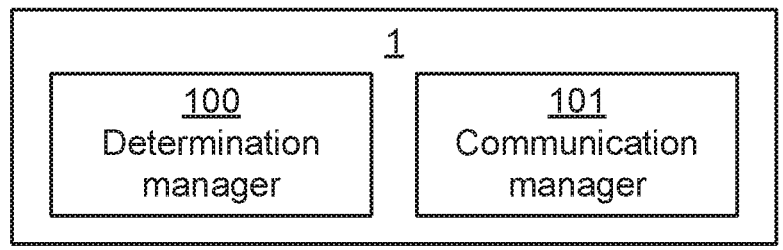
Fig. 10
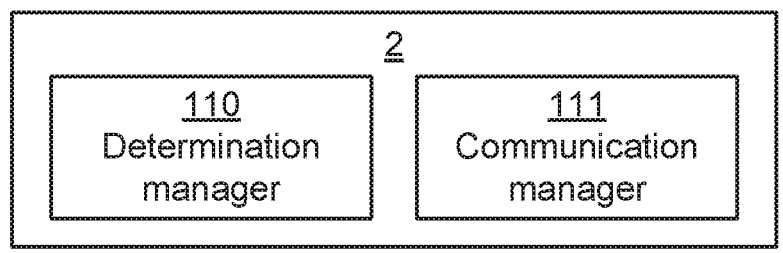
Fig. 11

METHOD AND ARRANGEMENT FOR PROVIDING AUTONOMOUS EMERGENCY ASSISTANCE

CROSS REFERENCE TO RELATED APPLICATION

This application is a 35 U.S.C. § 371 national stage application of PCT International Application No. PCT/EP2017/084475, filed on Dec. 22, 2017, the disclosure and content of which is incorporated herein by reference in its entirety.

TECHNICAL FIELD

The invention relates to methods for enabling autonomous emergency assistance for a communication device, communication devices, unmanned aerial vehicles, computer programs and computer program products thereof.

BACKGROUND

Unmanned aerial vehicles (UAVs) are used in a wide variety of applications throughout the society. Examples include delivery services, aerial photography and film making, remote sensing tasks for agriculture, city planning, civil engineering, support for public safety and rescue services, etc. There are many different types of UAVs that can be remotely controlled using Wi-Fi or some proprietary radio technology. UAVs are capable of communication, sensing as well as autonomous operation and also able to analysing data collected via sensors, camera etc. UAVs can be used as relays between ground-based terminals and a network base station to extend the reach range of a network. Also, UAVs can serve as flying GSM base stations and then provide cellular network coverage to users [UAV-based GSM network for public safety communications, IEEE, K Guevara, 2015].

A robust network access is crucial for safe and efficient rescue operations related to emergency situations and in disaster areas. It is possible to set up mobile networks for voice and data communication that enable aid agencies to work more efficiently at disaster sites. This can e.g. be done using a satellite dish and Wi-Fi access points. Also, the Ericsson Response MiniGSM system is a total system solution including different functional components such as Mobile Switching Center (MSC), Base Station Controller (BSC), Radio Base Station (RBS), network management, network database and operations and maintenance (O&M). The unit is built into an easily transportable 7-foot long container, complete with climate control for the equipment. System maintenance and operation can be managed locally or remotely. The system supports both GSM 900, 1800 and 1900 MHz frequencies, either individually or dual band. The network can operate as standalone with its own network identity, or it can be part of a larger network. In both cases, subscribers from other networks can roam onto the MiniGSM system under the same conditions as for any other cellular network. Coverage areas with a radius of up to 35 kilometres can be established.

Voice or text-enabled digital assistants is a common phenomenon in our phones, computers or home appliances and are known by names such as Echo, Alexa, Siri, Cortana, and Google now. Common for all of these digital assistants is that they rely on internet access (i.e. are cloud based) and on the artificial intelligence (AI) technology known as deep learning (and natural language processing (NLP)), which requires access to huge amount of data to give software the ability to do things like understanding the human voice.

Techniques to improve coverage are numerous, for example better coding, more antennas, protocol improvements, scheduling, etc. The device-to-device (D2D) technology provides means for devices to communicate directly with each other without a connection through a radio base station or a coordinator device. Short wireless communication is one example where devices can use short range wireless communication technology, for example Wifi, Bluetooth, or ZigBee, to communicate with each other if one of the devices has a weak uplink (UL) cellular connection (i.e. a user equipment (UE) with connection can be used as a hotspot). Long term evolution (LTE) based D2D is another alternative, which has been standardized by the 3rd Generation Partnership Project (3GPP) to achieve efficient offloading from cellular mobile networks by utilizing the knowledge of proximity and spectrum reuse gains. By offloading the cellular system, the D2D technology helps improve the cellular system capacity. Choosing a D2D link to communicate when the cellular link is weak is beneficial for coverage improvement. A D2D link could use either UL or downlink (DL) spectrum in frequency division duplex (FDD) or time division duplex (TDD) mode. However, from an interference management efficiency point of view, it is more practical for the D2D connection to share the spectrum with the UL connection in LTE cellular networks, since the interference from D2D communications towards other UEs is potentially larger and more uncontrollable than that towards evolved nodeBs (eNBs).

US2016/360562 discusses Autonomous Unmanned Vehicles (UVs), which may include UAVs that can operate as mobile nodes or UV nodes in e.g. a mesh network, providing network access to terminals in remote locations. Terminals considered friendly to the UV can access the network via the UV. It is described how commands can be pre-set for specific tasks to be executed by a terminal after reception from an UV node. Only known or friendly devices can access the network provided by the UVs.

US2016/191142 discloses a method for improving cellular coverage of existing (and operable) cellular networks by providing UAVs to a prioritized area so that the UAVs can operate as temporary mobile device cellular towers. The document focus on how to find areas that are about to be critical with respect to coverage or accessibility. It does not solve the problem of detecting and initiating a dialogue with people and devices in emergency situations.

US2016/337027 discloses a method for detecting an UAV by a ground terminal and to set-up a connection to a network via the UAV by directing an antenna beam towards the UAV. The ground terminal may e.g. be a mobile terminal. It only describes a method for a ground station to detect and connect to an UAV.

US2016/340006 discloses how to detect people in distress (swimmers in distress (SID)) using drones equipped with wireless communication module, acoustic sensors, camera etc. SIDs are detected using sensors and/or by SID wearable notification devices. It describes a solution for drones to detect SIDs.

SUMMARY

An object of embodiments presented herein is to enable autonomous emergency assistance for a communication device.

It may be difficult for a drone, i.e. a UAV, to locate and to establish group communication with CDs in distress. A solution for an autonomous emergency UAV to detect a CD and to setup a dedicated group is presented, engaging both the UAV and CDs in distress, for further communication using D2D communication.

According to a first aspect, there is presented a method for enabling autonomous emergency assistance for a CD registered in a regular cellular network. The method is performed in an autonomous UAV and comprises directing the UAV to a geographical region connected to a preregistered position of the CD, emulating a cellular network in the geographical region, wherein the UAV and the CD are without connectivity with the regular cellular network, and providing autonomous emergency assistance for the CD in the geographical region.

The method may further comprise receiving one or more Group_ID from a network entity, before directing the UAV to the geographical region, for use in a group discovery message.

The method may further comprise sending a group discovery message in the geographical region, and receiving a discovery response message from the CD, in response to the sent group discovery message. The discovery response message may comprise an indication of one or more of the following: user identification, stress level, geographical position, and CD status. The group discovery message may be sent during a preconfigured time interval for discontinuous reception, DRX, of the one or more CD. The method may further comprise initiating a communication session with the CD from which a discovery response message has been received. The method may further comprise initiating a group communication session with more than one CD.

The method may further comprise directing the UAV to a location where it is capable of establishing a network connection, after providing autonomous emergency access, wherein the CD from which a discovery response message has been received is still without connectivity with the regular cellular network.

The directing may be triggered by the CD failing to register presence in the regular cellular network at the preregistered geographical position within a corresponding preregistered period of time.

According to a second aspect, there is presented a method for enabling autonomous emergency assistance for a CD registered in a regular cellular network. The method is performed in the CD and comprises providing one or more geographical position, connected to corresponding preregistered periods of time, to the regular cellular network, wherein the provided one ore more geographical position is preregistered in the regular cellular network, receiving a Group_ID from the regular cellular network, in response to providing the preregistered one or more geographical position, and receiving autonomous emergency assistance from an autonomous UAV, wherein the UAV and the CD are without connectivity with the regular cellular network.

The method may further comprise receiving a group discovery message from the UAV, the group discovery message comprising an indication of the Group_ID, and sending a discovery response message to the UAV in response to the received group discovery message. The discovery response message may comprise an indication of one or more of the following: user identification, stress level, geographical position, and CD status. The group discovery message may be received during a preconfigured discontinuous reception, DRX, time interval.

The method may further comprise communicating with the UAV from which the group discovery response message has been received.

The method may further comprise group communicating with one or more other CDs connected to the Group_ID.

The method may further comprise triggering emergency assistance of the UAV by failing to register presence in the regular cellular network at a preregistered geographical position within the corresponding preregistered period of time. The triggering may be performed with a margin based on one or more of the following: distance, altitude, terrain, and estimated travelling time between preregistered geographical positions, and current weather.

According to a third aspect, there is presented a UAV for enabling autonomous emergency assistance for a CD registered in a regular cellular network. The UAV comprises a processing circuitry and a computer program product storing instructions that, when executed by the processing circuitry, causes the UAV to direct the UAV to a geographical region connected to a preregistered position of the CD, to emulate a cellular network in the geographical region, wherein the UAV and the CD are without connectivity with the regular cellular network, and to provide autonomous emergency assistance for the CD in the geographical region. The UAV may further be caused to receive one or more Group_ID from a network entity, before directing the UAV to the geographical region, for use in a group discovery message.

The UAV may further be caused to send a group discovery message in the geographical region, and to receive a discovery response message from the CD, in response to the sent group discovery message. The discovery response message may comprise an indication of one or more of the following: user identification, stress level, geographical position, and CD status. The group discovery message may be sent during a preconfigured time interval for discontinuous reception, DRX, of the one or more CD. The UAV may further be caused to initiate a communication session with the CD from which a discovery response message has been received. The UAV may further be caused to initiate a group communication session with more than one CD.

The UAV may further be caused to direct the UAV to a location where it is capable of establishing a network connection, after providing autonomous emergency access, wherein the CD from which a discovery response message has been received is still without connectivity with the regular cellular network.

The direct step may be triggered by the CD failing to register presence in the regular cellular network at the preregistered geographical position within a corresponding preregistered period of time.

According to a fourth aspect, there is presented a CD for enabling autonomous emergency assistance thereof, wherein the CD is registered in a regular cellular network. The CD comprises a processing circuitry and a computer program product storing instructions that, when executed by the processing circuitry, causes the CD to provide one or more geographical position, connected to corresponding preregistered periods of time, to the regular cellular network, wherein the provided one ore more geographical position is preregistered in the regular cellular network, to receive a Group_ID from the regular cellular network, in response to providing the preregistered one or more geographical position, and to receive autonomous emergency assistance from an autonomous UAV wherein the UAV and the CD are without connectivity with the regular cellular network.

The CD may further be caused to receive a group discovery message from the UAV, the group discovery message comprising an indication of the Group_ID, and to send a discovery response message to the UAV in response to the received group discovery message. The discovery response message may comprise an indication of one or more of the following: user identification, stress level, geographical position, and CD status. The group discovery message may be received during a preconfigured discontinuous reception, DRX, time interval.

The CD may further be caused to communicate with the UAV from which the group discovery response message has been received.

The CD may further be caused to group communicate with one or more other CDs connected to the Group_ID.

The CD may further be caused to trigger emergency assistance of the UAV by failing to register presence in the regular cellular network at a preregistered geographical position within the corresponding preregistered period of time. The trigger step may be performed with a margin based on one or more of the following: distance, altitude, terrain, and estimated travelling time between preregistered geographical positions, and current weather.

According to a fifth aspect, there is presented a UAV for enabling autonomous emergency assistance for a CD registered in a regular cellular network. The UAV comprises a determination manger for directing the UAV to a geographical region connected to a preregistered position of the CD, and for emulating a cellular network in the geographical region, wherein the UAV and the CD are without connectivity with the regular cellular network, and a communication manager for providing autonomous emergency assistance for the CD in the geographical region.

According to a sixth aspect, there is presented a CD for enabling autonomous emergency assistance thereof, wherein the CD is registered in a regular cellular network. The CD comprises a communication manager for providing one or more geographical position, connected to corresponding preregistered periods of time, to the regular cellular network, wherein the provided one ore more geographical position is preregistered in the regular cellular network, for receiving a Group_ID from the regular cellular network, in response to providing the preregistered one or more geographical position, and for receiving autonomous emergency assistance from an autonomous unmanned aerial vehicle, UAV, wherein the UAV and the CD are without connectivity with the regular cellular network.

According to a seventh aspect, there is presented a computer program for enabling autonomous emergency assistance for a CD registered in a regular cellular network. The computer program comprises computer program code which, when run on a UAV, causes the UAV to direct the UAV to a geographical region connected to a preregistered position of the CD, to emulate a cellular network in the geographical region, wherein the UAV and the CD are without connectivity with the regular cellular network, and to provide autonomous emergency assistance for the CD in the geographical region.

According to an eighth aspect, there is presented a computer program for enabling autonomous emergency assistance for a CD registered in a regular cellular network. The computer program comprises computer program code which, when run on the CD, causes the CD to provide one or more geographical position, connected to corresponding preregistered periods of time, to the regular cellular network, wherein the provided one ore more geographical position is preregistered in the regular cellular network, to receive a Group_ID from the regular cellular network, in response to providing the preregistered one or more geographical position, and to receive autonomous emergency assistance from a UAV, wherein the UAV and the CD are without connectivity with the regular cellular network.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 8-9 are schematic diagrams illustrating some components of devices presented herein; and FIGS. 10-11 are schematic diagrams showing functional modules of devices presented herein.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The key Radio Resource Management (RRM) techniques needed for realizing known D2D communication comprise:
  Mode Selection (MS) i.e., determine whether a D2D pair should communicate in direct mode using the D2D link or in cellular mode,
  Resource Allocation (RA) i.e., allocate the suitable physical resource block (PRB) or frequency channels to D2D communication,
  Paring i.e., referring to selecting the D2D pair and at most one cellular communication device (CD) that share the same resource block, and
  Power control, which is responsible for preventing the D2D layer from interfering with the cellular networks, while keeping high spectrum efficiency.

Other key functions in the D2D technology include D2D device registration, D2D pair discovery and D2D bearer management. Accurate and effective proximity detection is one of the key requirements for D2D communications. The proximity detection can be performed based on the LTE technology (e.g., in LTE directed D2D communication) or short range wireless communication techniques (Bluetooth, ZigBee, etc.).

In order to be able to perform D2D communications, the following four steps are normally required
Step 1: Synchronization
Step 2: Discovery
Step 3: Group establishment (signalling)
Step 4: Communication In following these four steps are elaborated by using LTE D2D as an exemplified technology.

Step 1: D2D Synchronization

Figure 1:
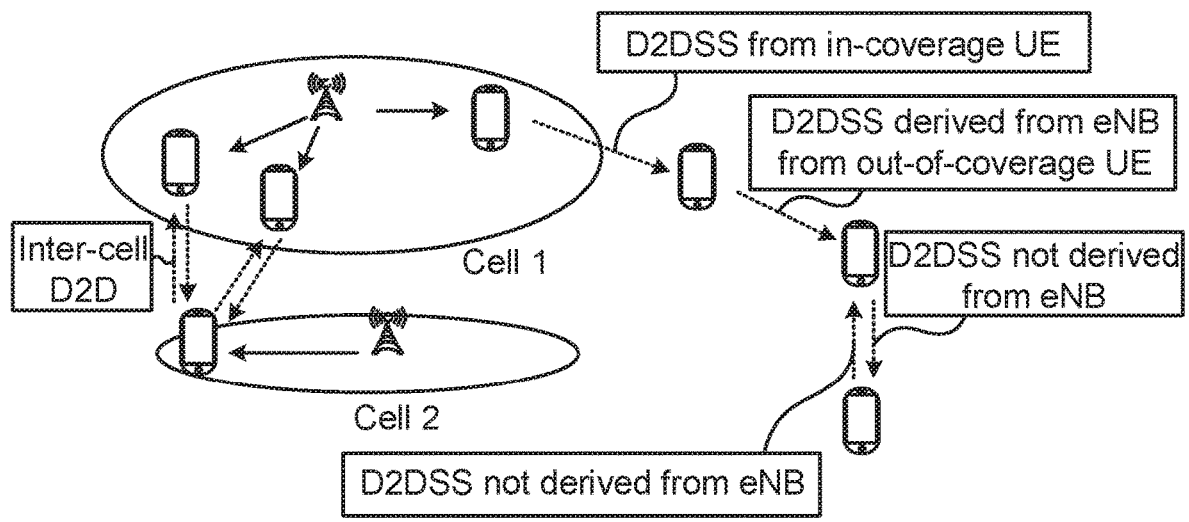
FIG. 1 schematically illustrates an example of a D2D synchronization procedure.

A D2D CD aligns, in a slightly simplified embodiment as illustrated with a user equipment (UE) in FIG. 1, the timing/frequency of transmitted D2D signals to the following synchronization sources, in decreasing priority:
eNBs that a CD camps on,
CDs within network coverage (among which higher priority is given to the strongest detected D2D synchronization signal D2DSS),
CDs out of network coverage transmitting D2DSS relayed from an in-coverage CD (among which higher priority is given to the strongest detected D2DSS), and
CDs out of network coverage transmitting D2DSS relayed from an out-of-coverage CD (among which higher priority is given to the strongest detected D2DSS).

Step 2: D2D Discovery Procedure

Proximity discovery is a radio-based application where CDs in proximity of each other are identified using Evolved Universal Terrestrial Radio Access (E-UTRA). There are two possible models of discovery: push-type discovery—"I am here" and pull-type discovery—"who is there"/"are you there". In the first model the announcing CD broadcasts the discovery messages at pre-defined discovery intervals and the CDs that are interested in these messages read them and process them. The second model involves two CD roles: the discovering CD transmits a request containing certain information about what it is interested in discovering; the other CDs that receive the request message can respond with some information related to the discoverer's request. It has been concluded in 3GPP Radio layer 2 and Radio layer 3 (RAN2) that there is no need to distinguish between PUSH and PULL models, respectively, on access stratum. I.e., it is assumed that a mechanism to trigger transmission of a D2D discovery message upon reception of another D2D discovery message can be realized by higher layers if a need is identified.

Moreover, there are two types of discovery: open and restricted. Open is the type where no explicit permission is needed from the CD being discovered. Whereas alternatively restricted discovery only takes place with explicit permission from the CD that is being discovered. It is also concluded in 3GPP RAN2 that there is no need to distinguish between open and restricted discovery on access stratum level.

Figure 2:
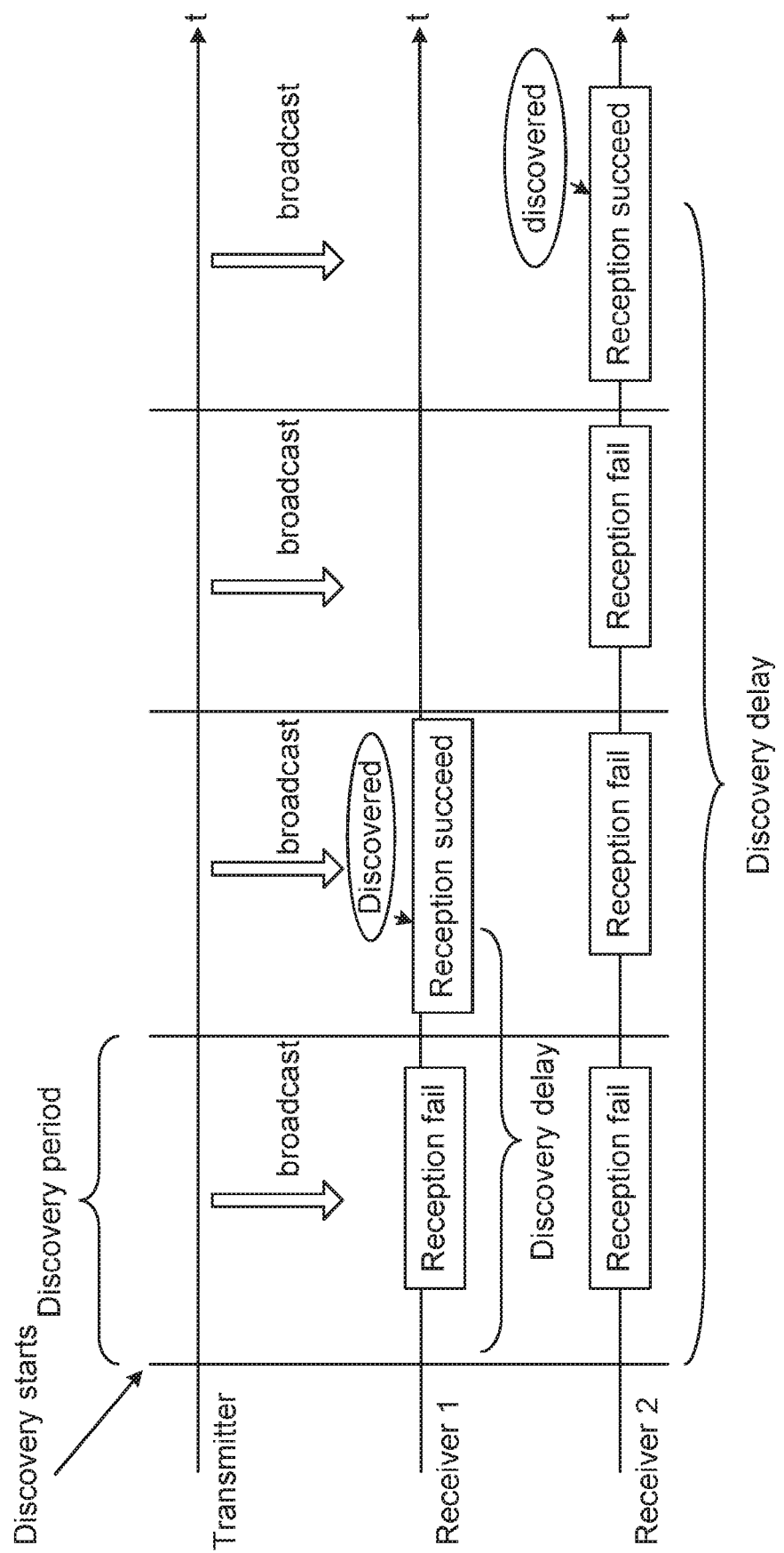
FIG. 2 schematically illustrates an example of an LTE D2D discovery procedure.

During the discovery, a discovery message is transmitted. The discovery transmitter broadcasts the discovery message periodically during each period. The transmitter is discovered by a receiver when this receiver receives the discovery message successfully. One example of an LTE D2D discovery procedure is illustrated in FIG. 2. A first receiver is discovered in the second broadcast period, and a second receiver is discovered in the fourth broadcast period. The discovery delays for the first and second receivers are also illustrated.

Step 3: D2D Group Establishment

Figure 3:
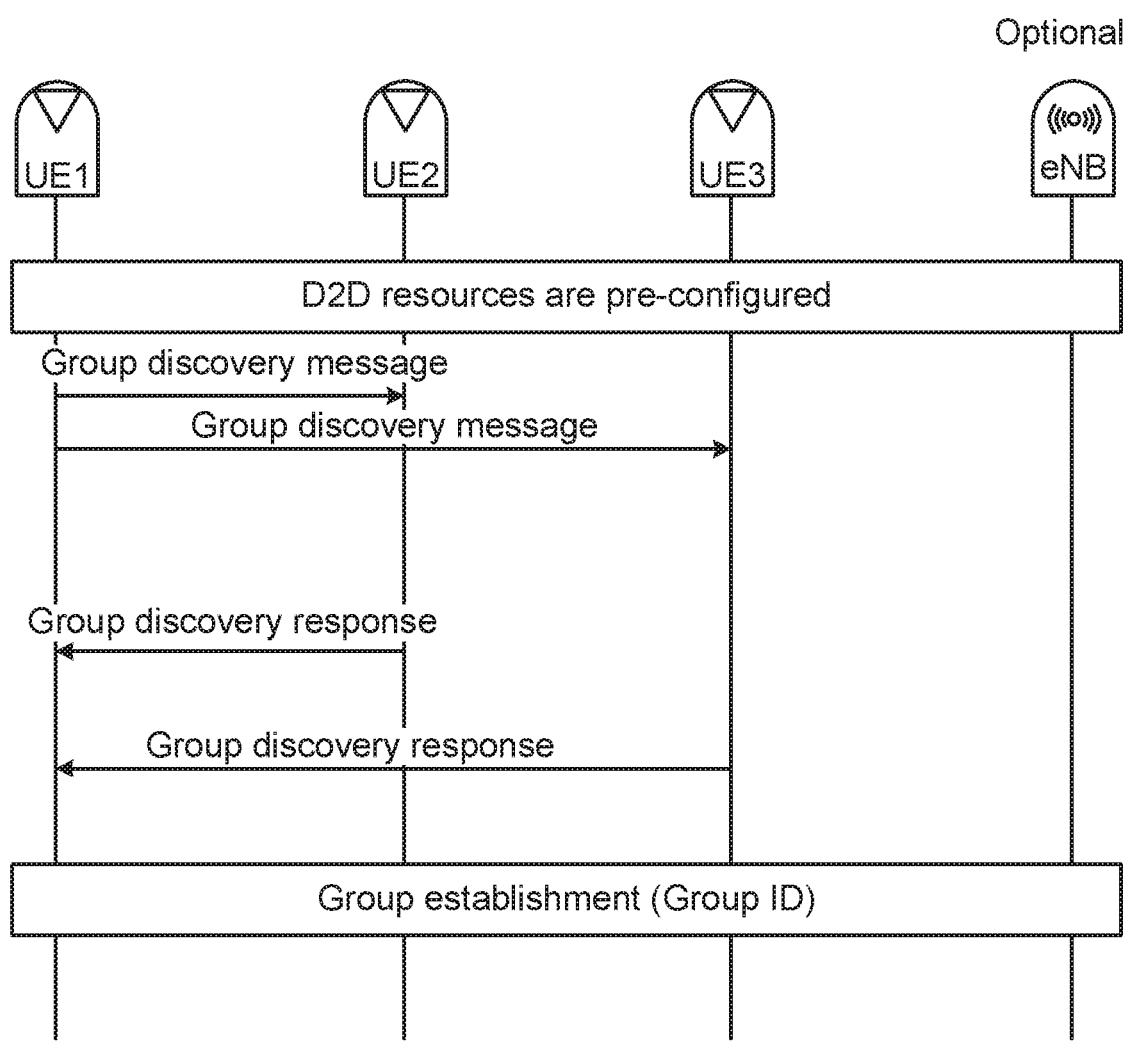
FIG. 3 schematically illustrates an example of an LTE D2D group establishing procedure.

The group establishment procedure is to find users in proximity of each other willing to form a group, and one example on LTE D2D group establishment procedure is illustrated in FIG. 3 with UEs as CDs.

A UE1 broadcasts a Group Discovery message. Neighbour UEs, UE2 and UE3, with successful reception replies with acknowledgement messages. The group identity Group_ID may be preconfigured and sent by the network to the group members via cellular connections.

The group discovery message may comprise only a Group_ID and the senders ID, indicating that a response should comprise a predetermined content. The predetermined content may e.g. comprise on or more of the following: position, health data, battery level, User_ID. The group discovery message may further comprise an indication, such as one or more flags, determining which content a response should comprise.

The LTE standard defines formats for UE ID and Group_ID. Group establishment may be categorized into 1) preconfigured groups and 2) dynamically established groups. The LTE standard does not specify the signalling procedure for a dynamic group establishment, and any grouping protocols can thus be reused here.

Step 4: D2D Communication

All CDs used for Public Safety communication are D2D enabled, i.e. a CD that supports D2D communication requirements and associated procedures. Unless explicitly stated otherwise, a D2D-enabled CD refers both to a non-public safety CD and a public safety CD. Herein, it is assumed that a D2D-enabled CD is configured with information on resources that can be used for D2D, authentication/encryption, setup of (layer 2 (L2)) protocols, group identity(ies), D2D CD identity, and D2D Application identity(ies). Discovery is not a pre-requisite in order to perform D2D communication.

For communication, there are two coverage scenarios from a functional point of view, namely, when the transmitter is in coverage and when the transmitter is out-of-coverage. D2D communication for Public Safety is more important in partial coverage and out-of-coverage. The out-of-coverage scenario, however, has received a lot of attention in the society due to that no cellular solution alternative exists in this scenario for Public Safety. Correspondingly, 3GPP has defined two transmission modes for D2D communications, i.e., mode 1 (in coverage) and mode 2 (out-of-coverage).

Figure 4:
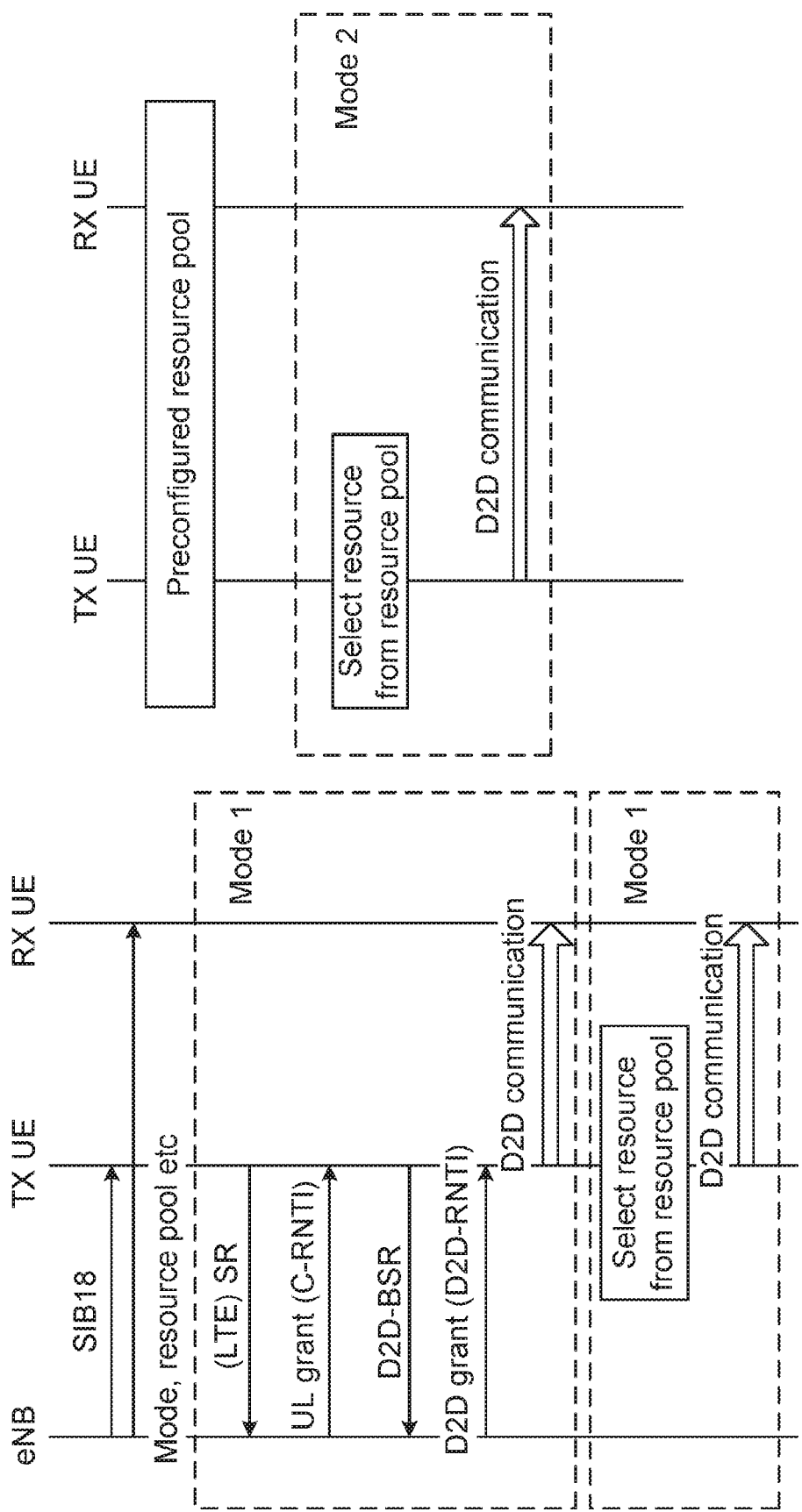
FIG. 4 schematically illustrates example of two modes of LTE D2D communication procedures.

One example of mode 1 is illustrated to the left in FIG. 4 and one example of mode 2 is illustrated to the right in FIG. 4. In mode 1, the transmitting (TX) CD (here illustrated as a UE) and the receiving (RX) CD (here illustrated as a UE) are initially in coverage, thus in connectivity with the eNB. Thereby, the eNB is able to perform dynamic scheduling and assign the resources for the D2D communication. UEs which are in mode 2 don't have connectivity to the eNB, and UEs in this mode would randomly select the resources by themselves for D2D communications in a resource pool which is preconfigured by the eNB, correspondingly, it is risky that UEs may choose the same resources, that can lead to transmission collision.

These documents cover ways of setting up temporary connections both as replacement and for adding capacity. Predetermined commands can be provided from an UAV to a terminal for accomplishing certain tasks, and sensors can be used for collecting data. Terminals can find a UAV and UAVs can search for terminals.

However, when there is poor or no network coverage, e.g. due to some disaster or in the wilderness, or a user is hurt or just lost, it is difficult to provide correct and timely assistance to the user. Even if a UAV is sent to the area with sensors, such as cameras, and connectivity, the task of locating the user in need of assistance is difficult. Especially in the extreme case where the user is incapable of initiating any CD function.

It is difficult to initiate a dialogue between a UAV and a CD, since they may be unknown to each other, in an area with no network access or very limited network access.

It is also not possible to dial an emergency call in an area with no or very limited networks access.

A solution for an autonomous emergency UAV that finds people/devices, and establishes a device-to-device (D2D) based communication link between the UAV and a CD is presented herein. The UAV may support communication with people in an emergency situation, and provide assistance and guidance to people who need help, e.g. when being lost in the wilderness.

The following components are suggested to interact in order to solve the problem mentioned above: a UAV that emulate a cellular network and that runs an emergency assistant software; a CD with cellular subscription; and an operation centre. The CD may e.g. be a UE such as a smartphone or an Internet-of-thing (IoT) device being activated in case of an emergency.

The presented solution provides an efficient way to locate, initiate dialogue and assist people in distress. It provides emergency assistance in situations with no or limited network access.

A solution for an autonomous emergency UAV is presented, which finds people/devices, based on D2D technology, to setup a group engaging both vehicle and CDs. After group establishment, the UAV and CDs can initiate a dialogue and the UAV may provide assistance and guidance to people in distress.

The solution may include service registration and monitoring and lost finding made by a checkpoint, before further lost finding via D2D assisted UAV is initiated. A checkpoint may be a regular cellular base station, a wifi access point, or other wireless connection point, allowing automatic verification by the CD, or a device, such as a computer, allowing manual verification by the user of the CD.

Autonomous Emergency UAV Using D2D Communication

An emergency service is according to an embodiment enabled via the following steps: checkpoint registration and further lost finding via D2D assisted UAV. The embodiment may further comprise service registration, checkpoint verification, and monitoring and lost finding by the checkpoints.

Step 1: Service and Checkpoint Registration

Before initiating a journey, a CD must register to the service, and indicate that the user would like to subscribe to the emergency assistance service.

During registration the service is configured to transfer a Group_ID (as defined in the D2D standard of 3GPP) to the CD, which may be used in the following steps. The CD may also transfer a network User_ID to the system to use in step 2, e.g. indicating CD capabilities. The Group_ID is unique for a user or a party that travels together. The User_ID may be International Mobile Subscriber Identity (IMSI), Cell Radio Network Temporary Identifier (C-RNTI) or other ID, that is defined by the service. The Group_ID is associated with certain security/integrity keys, for the communication within the group. In such a way, the users in the group are able to broadcast information within the group. At the same time, one user is also able to perform dedicated communication with another user in the group.

The CD must be D2D capable, e.g., LTE D2D capable. After service registration, the CD may download a planned path in a checkpoint registration, comprising geographical positions and corresponding period of times. The planned path may include a map, which comprises locations for the checkpoints along the planned path together with certain time periods. The checkpoint registration may also contain information on the service procedure for the CD, in case the CD experiences any emergency situation. On these registered checkpoints, the user is expected to show his presence at the expected preregistered time periods by a checkpoint verification. The time periods are when the user expects to be able to arrive at each respective checkpoint. During the checkpoint registration of the planned path, the user may be provided with details of the terrain, such a distance and altitude between checkpoints, and expected weather conditions. The user may also be provided with one or more suggestions of time periods to select between, e.g. based on terrain, expected weather, and/or user data provided by the user. The checkpoints typically have network connections, e.g. via cellular connection or satellite connections. A user may also subscribe to a re-occurring path, such as travelling from home to work and back. A planned path may e.g. be a planned walk in a national park with checkpoints along a track.

A user may also later adapt a registered planned path, e.g. based on when in time the user has arrived at a respective checkpoint. The user my e.g. be provided with one or more suggestions to adapt a planned path during each checkpoint verification. In case the user arrives earlier or later than the expected period of time for a checkpoint, suggested adaptations to the rest of the planned path may be based thereon. Correspondingly, in case the weather forecast has changed by a checkpoint verification, a suggested adaptation to the rest of the planned path may be based thereon. The user may however also select to use spare time to rest or select to try to catch up a late arrival.

Step 2: Checkpoint Verification

Upon reaching a preregistered checkpoint or position the user may make his presence known to the system. This may e.g. be made by:

a) A group discovery message is send with the Group_ID from step 1 at the checkpoint. Upon receiving the group discovery message, the CD responds with a group discovery response, thereby verifying its presence at the checkpoint. The group discovery message may be sent automatically by the checkpoint (which may be D2D capable), e.g. when the CD reaches the checkpoint. A user may also manually verify its presence at the checkpoint when arriving at checkpoint, either wirelessly through the CD or by a local device such as a computer. The group discovery response may comprise a user_ID confirming the identity of the user of the CD.

b) The CD may determine that it is close to a checkpoint by using a location service like Global Positioning System (GPS), which may be based on a map stored in the CD, and then broadcasts a group discovery message that can be received by the checkpoint, thereby verifying its presence at the checkpoint.

c) The checkpoint may be a wireless connection point such as a regular cellular base station or a wifi access point. When the CD discovers the checkpoint, it may follow the ordinary registration procedure which will make the User_ID automatically known to the system.

Step 3: Monitoring and Lost Finding by the Checkpoints

A contact centre may monitor the preregistered path. If a CD does not verify a preregistered CD passing a checkpoint within the preregistered time period, the contact centre creates an emergency event for the lost user. Upon triggering of the emergency event, the contact centre may try to reach the user in a larger area than only around the currently expected checkpoint. Group discovery messages with Group_ID are then transmitted from all checkpoints in a proximity area where it is feasible that the user may be. Alternatively or additionally, ordinary cellular paging of the User_ID may be used.

I.e., checkpoints along the path with network connection broadcast messages for the lost users. To reach a wider area, where there is no network coverage for the moment, while the connection may be re-established after a while, D2D communications or discovery mechanisms may be enabled. CDs at these checkpoints are requested to provide assistance to relay discovery messages, to reach the wider area. To save CD battery, the discovery messages may be broadcasted at a preconfigured time, which is also known to all registered CDs. The service may initiates step 4 if the lost CD doesn't acknowledge to the finding request within a certain time period, corresponding to a margin after the preregistered time period.

Step 4: Further Lost Finding Via D2D Assisted UAV

Figure 5:
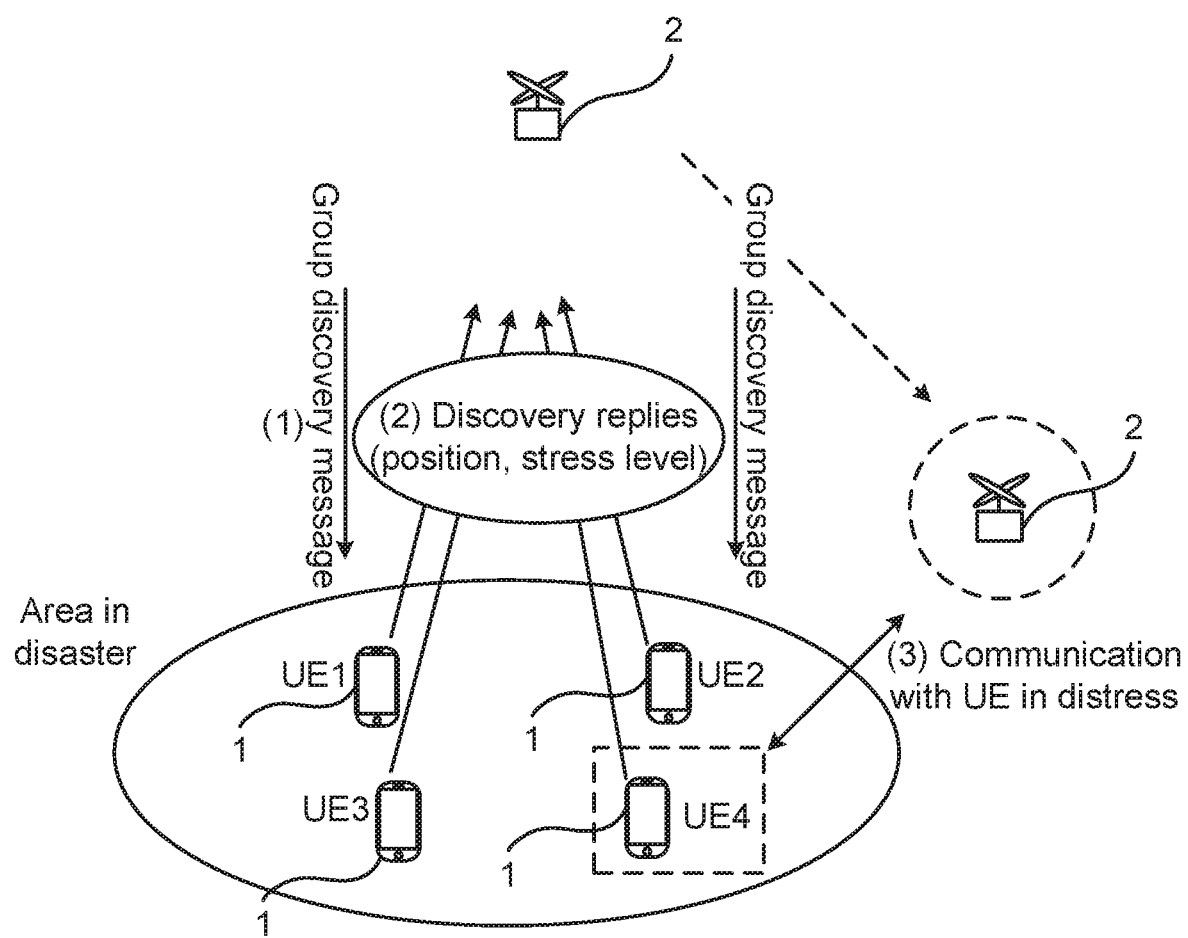
FIG. 5 schematically illustrates an environment where embodiments presented herein can be applied.

The service directs one or more UAV to the geographical region where the lost CD is expected to be. The geographical region where the lost CD is expected to be may be determined by calculating expected movement from the last checkpoint, which the lost CD has verified. The next checkpoint along the registered path may also be considered, in case the user has missed this checkpoint verification and continued to the next checkpoint. The UAV may be preconfigured with the Group_ID of the lost CD, and optionally with some additional Group_IDs, which additional Group_IDs can be used for further dedicated communication between the UAV and the lost CD separately. The different Group_IDs may also be associated with certain security/integrity keys. These keys are used to keep group communication connected to a Group_ID private. Members in one group are thus typically not able to read messages exchanged in other groups. When the UAV reaches the expected geographical region, the UAV may perform the following actions, as illustrated in FIG. 5 with UEs as CDs.

1) The UAV 2 and UEs 1 (UE1-UE4) in the geographical regions, here called disaster area, perform a discovery procedure to automatically discover each other. Both the UAV and the UEs are without connectivity to a regular cellular network.

2) Within the discovery procedure, automatic discovery messages sent by the UEs may carry information or indication of e.g. user identification (User_ID), geographical position (such as GPS position), stress level and UE status (such as e.g. sickness, an injury, or any other urgent need). Upon reception of the discovery messages sent from the UEs, the UAV may know the accurate position of UEs in the disaster area, and persons who first need assistance, e.g. depending on their provided stress levels. The received information may be needed to be sent to a contact centre for further processing. The contact centre can then instruct the UAV to first reach the persons who is in most need of assistance.

3) The UAV communicates with the identified persons, UE4, that are determined to be in distress (e.g. by being lost), in a predefined group with a corresponding Group_ID. For a case wherein a UE has more then one Group_ID, a new (smaller) group associated with an additional group ID may be established to include the UAV and only the intended persons, UE4. Security and integrity keys may be associated to the corresponding Group_ID.

UAVs may send discovery beacons at occasions that are a suitable multiple of a CD discontinuous reception (DRX) setting to ensure that some transmission is picked up by the UE. The suitable multiple of CD DRX setting is an example of the preconfigured time that is known by all registered UEs.

An information field may be added to the discovery procedure so that a user in distress can signal further situational data to the UAV, such as status, position, and biometrics.

When an UAV receives a message from an CD in distress a communication session may be started, only including the UAV and the CD. Access to the situation may be limited by a Group_ID.

Figure 7:
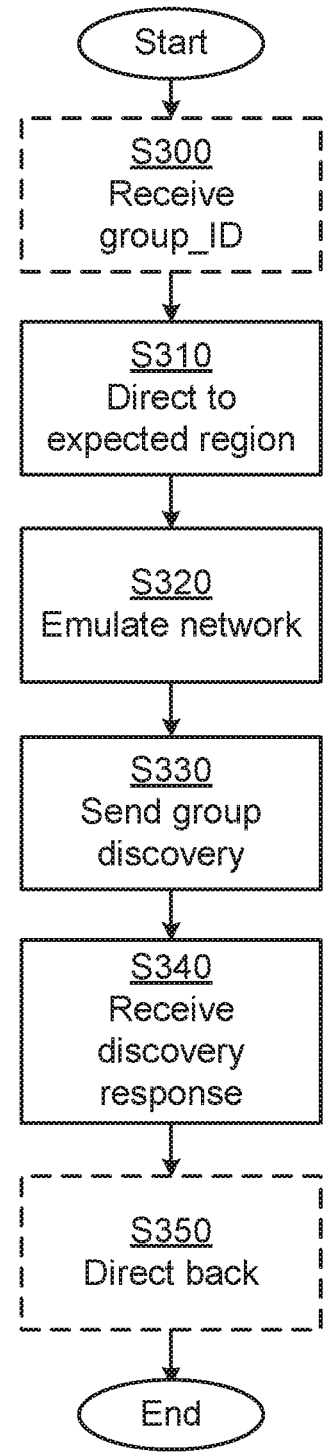

A method, according to an embodiment, for enabling autonomous emergency assistance for a CD registered in a regular cellular network, is presented with reference to FIG. 7. The method is performed in an UAV and comprises directing S310 the UAV to a geographical region connected to a preregistered position of the CD, emulating S320 a cellular network in the geographical region, wherein the UAV and the CD are without connectivity with the regular cellular network, and providing S330, S340 autonomous emergency assistance for the CD in the geographical region.

The method may further comprise receiving S300 one or more Group_ID from a network entity, before directing the UAV to the geographical region, for use in a group discovery message. The UAV may be preconfigured with all Group_IDs registered with the emergency assistance service. These Group IDs may represent groups with different sizes. Some Group IDs are intended to be used for smaller groups including only several group members. The UAV may receive a Group_ID connected to a lost CD in connection with a directing instruction to a desired geographical region, i.e. before starting to move away from connectivity with the regular cellular network. The network entity may be the regular cellular network, or an operation centre connected to the regular cellular network.

The method may further comprise sending S330 a group discovery message in the geographical region, and receiving S340 a discovery response message from the CD, in response to the sent group discovery message. The discovery response message may comprise an indication of one or more of the following: user identification, stress level, geographical position, and CD status. The group discovery message may be sent during a preconfigured time interval for discontinuous reception, DRX, of the one or more CD. The method may further comprise initiating a communication session with the CD from which a discovery response message has been received. The method may further comprise initiating a group communication session with more than one CD. A group communication session with more than one CD may be separately executed from dialogues between the UAV and the CDs.

The method may further comprise directing S350 the UAV to a location where it is capable of establishing a network connection, after providing autonomous emergency access, wherein the CD from which a discovery response message has been received is still without connectivity with the regular cellular network. The UAV may forward stored logging of dialogues with one or more CDs to a central unit for further processing.

The directing S310 may be triggered by the CD failing to register presence in the regular cellular network at the preregistered geographical position within a corresponding preregistered period of time. The triggering may e.g. be performed by a central unit in the regular cellular network or by an operation centre connected to the regular cellular network.

A UAV, according to an embodiment, for enabling autonomous emergency assistance for a CD registered in a regular cellular network, is presented with reference to FIG. 9. The UAV 2 comprises a processing circuitry 30 and a computer program product 32, 33 storing instructions that, when executed by the processing circuitry, causes the UAV to direct S310 the UAV to a geographical region connected to a preregistered position of the CD, to emulate S320 a cellular network in the geographical region, when the UAV and the CD are without connectivity with the regular cellular network, and to provide S330, S340 autonomous emergency assistance for the CD in the geographical region.

The UAV may further be caused to receive S300 one or more Group_ID from a network entity, before the UAV being directed to the geographical region, for use in a group discovery message.

The UAV may further be caused to send S330 a group discovery message in the geographical region, and to receive S340 a discovery response message from the CD, in response to the sent group discovery message. The discovery response message may comprise an indication of one or more of the following: user identification, stress level, geographical position, and CD status. The group discovery message may be sent during a preconfigured time interval for discontinuous reception, DRX, of the one or more CD. The UAV may further be caused to initiate a communication session with the CD from which a discovery response message has been received. The UAV may further be caused to initiate a group communication session with more than one CD.

The UAV may further be caused to direct S350 the UAV to a location where it is capable of establishing a network connection, after providing autonomous emergency access, wherein the CD from which a discovery response message has been received is still without connectivity with the regular cellular network.

The direct S310 may be triggered by the CD failing to register presence in the regular cellular network at the preregistered geographical position within a corresponding preregistered period of time.

FIG. 9 is a schematic diagram showing some components of the UAV 2. A processing circuitry 30 may be provided using any combination of one or more of a suitable central processing unit, CPU, multiprocessing circuitry, microcontroller, digital signal processing circuitry, DSP, application specific integrated circuit etc., capable of executing software instructions of a computer program 34 stored in a memory. The memory can thus be considered to be or form part of the computer program product 32. The processing circuitry 30 may be configured to execute methods described herein with reference to FIG. 7.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 33 in the form of a data memory may also be provided, e.g. for reading and/or storing data during execution of software instructions in the processing circuitry 30. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 35, to improve functionality for the UAV 2.

The UAV 2 may further comprise an input/output (I/O) interface 31 including e.g. a user interface. The UAV 2 may further comprise a receiver configured to receive signalling from other nodes, and a transmitter configured to transmit signalling to other nodes (not illustrated). Other components of the UAV 2 are omitted in order not to obscure the concepts presented herein.

FIG. 11 is a schematic diagram showing functional blocks of the UAV 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 7, comprising a determination manager unit 110 and a communication manager unit 111. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 110 is for enabling autonomous emergency assistance for a CD registered in a regular cellular network. This module corresponds to the receive step S300, the send step S330, and the receive step S340 of FIG. 7. This module can e.g. be implemented by the processing circuitry 30 of FIG. 9, when running the computer program.

The communication manager 111 is for enabling autonomous emergency assistance for a CD registered in a regular cellular network. This module corresponds to the direct step S310, the emulate step S320, and the direct step S350 of FIG. 7. This module can e.g. be implemented by the processing circuitry 30 of FIG. 9, when running the computer program.

A computer program 34, 35, according to an embodiment, for enabling autonomous emergency assistance for a CD registered in a regular cellular network is presented with reference to FIG. 9. The computer program comprising computer program code which, when run on an UAV, causes the UAV to direct S310 the UAV to a geographical region connected to a preregistered position of the CD, to emulate S320 a cellular network in the geographical region, wherein the UAV and the CD are without connectivity with the regular cellular network, and to provide S330, S340 autonomous emergency assistance for the CD in the geographical region.

Figure 6:
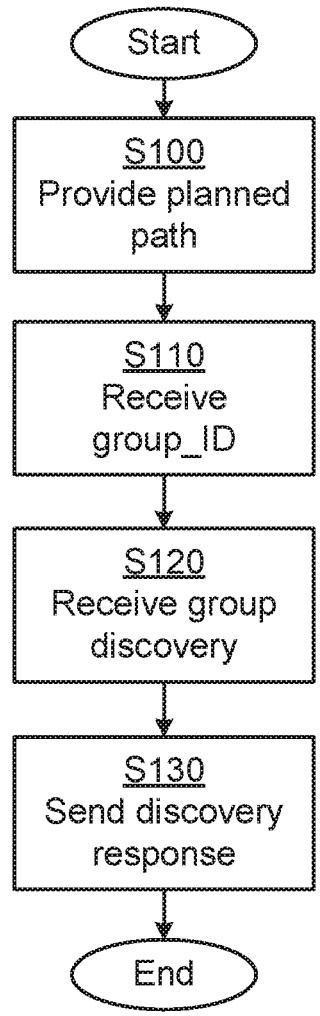
FIGS. 6-7 are flow charts illustrating methods for embodiments presented herein.

A method, according to an embodiment, for enabling autonomous emergency assistance for a CD registered in a regular cellular network, is presented with reference to FIG. 6. The method is performed in the CD and comprises providing S100 one or more geographical position, connected to corresponding preregistered periods of time, to the regular cellular network, wherein the provided one ore more geographical position is preregistered in the regular cellular network, receiving S110 a Group_ID from the regular cellular network, in response to providing the preregistered one or more geographical position, and receiving S120, S130 autonomous emergency assistance from an UAV, wherein the UAV and the CD are without connectivity with the regular cellular network.

The method may further comprise receiving S120 a group discovery message from the UAV, the group discovery message comprising an indication of the Group_ID, and sending S130 a discovery response message to the UAV in response to the received group discovery message. The discovery response message may comprise an indication of one or more of the following: user identification, stress level, geographical position, and CD status. The group discovery message may be received during a preconfigured discontinuous reception, DRX, time interval.

The method may further comprise communicating with the UAV from which the group discovery response message has been received.

The method may further comprise group communicating with one or more other CDs connected to the Group_ID.

The method may further comprise triggering emergency assistance of the UAV by failing to register presence in the regular cellular network at a preregistered geographical position within the corresponding preregistered period of time. The triggering may be performed with a margin based on one or more of the following: distance, altitude, terrain, and estimated travelling time between preregistered geographical positions, and current weather.

A CD, according to an embodiment, for enabling autonomous emergency assistance thereof, wherein the CD is registered in a regular cellular network, is presented with referend to FIG. 8. The CD comprises a processing circuitry 10 and a computer program product 12, 13 storing instructions that, when executed by the processing circuitry, causes the CD to provide S100 one or more geographical position, connected to corresponding preregistered periods of time, to the regular cellular network, wherein the provided one ore more geographical position is preregistered in the regular cellular network, to receive S110 a Group_ID from the regular cellular network, in response to providing the preregistered one or more geographical position, and to receive S120, S130 autonomous emergency assistance from an autonomous unmanned aerial vehicle, UAV, wherein the UAV and the CD are without connectivity with the regular cellular network.

The CD may further be caused to receive S120 a group discovery message from the UAV, the group discovery message comprising an indication of the Group_ID, and to send S130 a discovery response message to the UAV in response to the received group discovery message. The discovery response message may comprise an indication of one or more of the following: user identification, stress level, geographical position, and CD status. The group discovery message may be received during a preconfigured discontinuous reception, DRX, time interval.

The CD may further be caused to communicate with the UAV from which the group discovery response message has been received.

The CD may further be caused to group communicate with one or more other CDs connected to the Group_ID.

The CD may further be caused to trigger emergency assistance of the UAV by failing to register presence in the regular cellular network at a preregistered geographical position within the corresponding preregistered period of time. The trigger may be performed with a margin based on one or more of the following: distance, altitude, terrain, and estimated travelling time between preregistered geographical positions, and current weather.

FIG. 8 is a schematic diagram showing some components of the CD 1. A processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The computer program may be implemented as an app in the CD, configured to perform method steps descried herein with reference to FIG. 6. The computer program may alternatively be implemented in other ways, such as by being pre-configured program in the CD, or by being a program which is downloadable into the CD without being an app. The memory can thus be considered to be or form part of the computer program product 12. The processing circuitry 10 may be configured to execute methods described herein with reference to FIG. 6.

An app in a CD may be configured to cause the CD to provide S100 one or more geographical position, connected to corresponding preregistered periods of time, to the regular cellular network, wherein the provided one ore more geographical position is preregistered in the regular cellular network, to receive S110 a Group_ID from the regular cellular network, in response to providing the preregistered one or more geographical position, and to receive S120, S130 autonomous emergency assistance from an autonomous unmanned aerial vehicle, UAV, wherein the UAV and the CD are without connectivity with the regular cellular network.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the CD 1.

The CD 1 may further comprise an input/output, I/O, interface 11 including e.g. a user interface. The CD 1 may further comprise a receiver configured to receive signalling from other nodes, and a transmitter configured to transmit signalling to other nodes (not illustrated). Other components of the CD 1 are omitted in order not to obscure the concepts presented herein.

FIG. 10 is a schematic diagram showing functional blocks of the CD 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6, comprising a determination manager unit 100 and a communication manager unit 101. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 100 is for enabling autonomous emergency assistance for the CD registered in a regular cellular network. This module corresponds to the provide planned path step S100 of FIG. 6. This module can e.g. be implemented by the processing circuitry 10 of FIG. 8, when running the computer program.

The communication manager unit 101 is for enabling autonomous emergency assistance for the CD registered in a regular cellular network. This module corresponds to the receive step S100, the receive step S120 and the send step S130 of FIG. 6. This module can e.g. be implemented by the processing circuitry 10 of FIG. 8, when running the computer program.

A computer program 14, 15, according to an embodiment, for enabling autonomous emergency assistance for a CD registered in a regular cellular network is presented with reference to FIG. 8. The computer program comprising computer program code which, when run on the CD, causes the CD to provide S100 one or more geographical position, connected to corresponding preregistered periods of time, to the regular cellular network, wherein the provided one or more geographical position is preregistered in the regular cellular network, to receive S110 a Group_ID from the regular cellular network, in response to providing the pre-registered one or more geographical position, and to receive S120, S130 autonomous emergency assistance from an UAV, wherein the UAV and the CD are without connectivity with the regular cellular network.

A computer program product 12, 13 and 32, 33 comprising a computer program 14, 15 and 34, 35 and a computer readable storage means on which the computer program 14, 15 and 34, 35 is stored, is also presented with reference to FIGS. 8 and 9.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An autonomous unmanned aerial vehicle, UAV, for enabling autonomous emergency assistance for a communication device, CD, registered in a regular cellular network, the UAV comprising:
a processing circuitry; and
a computer program product storing instructions that, when executed by the processing circuitry, causes the UAV to:
direct the UAV to a geographical region connected to a preregistered position of the CD;
send a group discovery message in the geographical region;
receive a discovery response message from the CD, in response to the sent group discovery message;
emulate a cellular network in the geographical region, wherein the UAV and the CD are without connectivity with the regular cellular network; and
provide autonomous emergency assistance for the CD in the geographical region.

2. The UAV according to claim 1, further caused to:
receive one or more Group_ID from a network entity, before directing the UAV to the geographical region, for use in a group discovery message.

3. The UAV according to claim 1, wherein the discovery response message comprises an indication of user identification.

4. The UAV according to claim 1, wherein the group discovery message is sent during a preconfigured time interval for discontinuous reception, DRX, of the one or more CD.

5. The UAV according to claim 1, further caused to initiate a communication session with the CD from which a discovery response message has been received.

6. The UAV according to claim 1, further caused to initiate a group communication session with more than one CD.

7. The UAV according to claim 1, further caused to direct the UAV to a location where it is capable of establishing a network connection, after providing autonomous emergency access, wherein the CD from which a discovery response message has been received is still without connectivity with the regular cellular network.

8. The UAV according to claim 1, wherein the direct is triggered by the CD failing to register presence in the regular cellular network at the preregistered geographical position within a corresponding preregistered period of time.

9. The UAV according to claim 1, wherein the discovery response message comprises an indication of stress level.

10. The UAV according to claim 1, wherein the discovery response message comprises an indication of geographical position.

11. The UAV according to claim 1, wherein the discovery response message comprises an indication of CD status.

* * * * *